(12) United States Patent
Yanik et al.

(10) Patent No.: US 8,003,835 B2
(45) Date of Patent: Aug. 23, 2011

(54) BIOMASS CONVERSION PROCESS

(75) Inventors: Steve Yanik, Colorado Springs, CO (US); Robert Bartek, Centennial, CO (US); Paul O'Connor, Hoevelaken (NL); Dennis Stamires, Dana Point, CA (US); Michael Brady, Studio City, CA (US)

(73) Assignee: Kior Inc., Pasadena, TX (US)

( * ) Notice: Subject to any disclaimer, the term of this patent is extended or adjusted under 35 U.S.C. 154(b) by 119 days.

(21) Appl. No.: 12/606,804

(22) Filed: Oct. 27, 2009

(65) Prior Publication Data

US 2010/0105970 A1    Apr. 29, 2010

Related U.S. Application Data

(60) Provisional application No. 61/108,657, filed on Oct. 27, 2008.

(51) Int. Cl.
*C07C 1/00* (2006.01)
*F27B 15/08* (2006.01)

(52) U.S. Cl. ........................................ 585/240; 585/242

(58) Field of Classification Search .................. 585/240, 585/242, 638, 639; 422/144, 145, 147; 208/76, 208/75, 77
See application file for complete search history.

(56) References Cited

U.S. PATENT DOCUMENTS

| | | | |
|---|---|---|---|
| 6,538,169 B1 * | 3/2003 | Pittman et al. | 585/653 |
| 7,029,571 B1 * | 4/2006 | Bhattacharyya et al. | 208/76 |
| 7,083,762 B2 * | 8/2006 | Kuechler et al. | 422/144 |
| 7,122,160 B2 * | 10/2006 | Brookhart | 422/145 |
| 7,195,741 B2 * | 3/2007 | Lattner et al. | 422/141 |
| 7,288,685 B2 * | 10/2007 | Marker | 585/240 |
| 7,385,099 B2 * | 6/2008 | Kuechler et al. | 585/640 |
| 2009/0026112 A1 * | 1/2009 | Dierickx et al. | 208/119 |

* cited by examiner

*Primary Examiner* — N. Bhat

(57) ABSTRACT

A method for converting solid biomass into hydrocarbons includes contacting the solid biomass with a catalyst in a first riser operated at a temperature in the range of from about 50° C. to about 200° C. to thereby produce a first biomass-catalyst mixture and a first product comprising hydrocarbons; a) separating the first product from the first biomass-catalyst mixture; c) charging the first biomass-catalyst mixture to a second riser operated at a temperature in the range of from about 200° C. to about 400° C. to thereby produce a second biomass-catalyst mixture and a second product comprising hydrocarbons; d) separating the second product from the second biomass-catalyst mixture; e) charging the second biomass-catalyst mixture to a third riser operated at a temperature greater than about 450° C. to thereby produce a spent catalyst and a third product comprising hydrocarbons; and f) separating the third effluent from the spent catalyst.

17 Claims, 2 Drawing Sheets

BIOMASS CONVERSION PROCESS

CROSS REFERENCE TO RELATED APPLICATIONS

Related Application No. 61/076,962, entitled "Co-Processing Solid Biomass in a Conventional Petroleum Refining Process Unit" and filed on Jun. 30, 2008 by Yanik et al., is incorporated by reference herein in its entirety.

FIELD OF THE INVENTION

The invention relates to producing a fuel or specialty chemical product from biomass through a chemical process. The invention relates more particularly to preparing solid biomass for catalytic conversion and to deoxygenating, catalytically cracking, and converting the biomass into a fuel or specialty chemical product.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) P 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Producing fuels and specialty chemicals from biomass can require specialized conversion processes and/or refineries, which are distinct from and incompatible with conventional petroleum-based conversion processes and refineries. Thus, the wide-spread use and implementation of biomass to produce fuels and specialty faces many challenges, because large-scale production facilities are not widely available and are expensive to build. Furthermore existing processes can require extreme conditions (e.g., high temperature and/or pressure, which increases capital and operating costs), require expensive catalysts, suffer low conversion efficiency (e.g., incomplete conversion or inability to converts ligno- and hemi-cellulosic material), and/or suffer poor product selectivity.

Another challenge to the use of biomass feedstock to produce fuel or specialty chemical products is high acidity (i.e., low pH) in bio-oil intermediates produced from pyrolyzing the biomass feedstock. High acidity can cause problems such as corrosion in conventional fluid catalytic cracking (FCC) equipment and thus can require costly upgrades to conventional FCC units to resist corrosion (e.g., upgrades with exotic, corrosion-resistant alloys such as a HASTELLOY® alloy available from Haynes International, Inc.).

BRIEF SUMMARY OF THE INVENTION

In various embodiments the invention includes methods, apparatuses, kits, and compositions for converting cellulosic (e.g., including ligno- and hemi-cellulosic) material in biomass (e.g., including edible and inedible portions) into fuels and/or specialty chemicals under conditions that can mitigate equipment cost, energy cost, and/or degradation or undesirable reaction of conversion product. Examples of fuels include light gases (ethane, propane, butane), naphtha, and distillates (jet fuel, diesel, heating oil). Examples of chemicals include light olefins (ethylene, propylene, butylenes), acids (like formic and acetic), aldehydes, alcohols (ethanol, propanol, butanol, phenols), ketones, furans, and the like. For example, the technology includes preparing solid biomass particles for catalytic conversion, which can improve conversion of the biomass into fuels and/or specialty chemicals in conventional petroleum refining processes (e.g., known petrochemical refining units). The technology also includes adapting existing refinery processes for processing biomass (e.g., change operating parameters, catalyst, and feedstock), retrofitting existing refinery process units for processing biomass (e.g., adding an extra riser for biomass catalytic cracking or adding a solid biomass feeder system to introduce biomass), and constructing new, purpose-built biomass reactors (e.g., employ commercially available conventional reactor components). Thus, the methods, apparatuses, kits, and compositions can reduce the cost and increase the availability of fuel and/or specialty chemicals derived from biomass. Preparation can have a synergistic effect, reducing the temperature necessary for catalytic or pyrolytic conversion of the biomass and/or increasing the conversion efficiency of the biomass, as well as facilitating processing in conventional refining units.

In one aspect, the technology features a method for converting solid biomass into a fuel or specialty chemical product. First, the method includes pretreating a plurality of solid biomass particles and a catalyst at a temperature below about 200° C., to produce a biomass-catalyst mixture. Second, the method includes deoxygenating and cracking the biomass-catalyst mixture with steam and a temperature below about 400° C., to produce a deoxygenated product. Third, the method includes converting the deoxygenated product and remaining biomass-catalyst mixture with steam and a temperature above about 450° C., to produce the fuel or specialty chemical product.

In another aspect, the technology features a method for converting solid biomass into a fuel or specialty chemical product. The method includes agitating a plurality of solid biomass particles and a catalyst at a temperature below about 200° C., to produce a biomass-catalyst mixture having a mechano-chemical interaction between the solid biomass particles and the catalyst. The method also includes deoxygenating and cracking the biomass-catalyst mixture with steam and a temperature below about 400° C., to produce the fuel or specialty chemical product.

In other examples, any of the aspects above, or any method, apparatus, or composition of matter described herein, can include one or more of the following features.

In various embodiments, pretreating includes agitating the plurality of solid biomass particles and the catalyst, to produce a biomass-catalyst mixture having a mechano-chemical interaction between the solid biomass particles and the catalyst.

In some embodiments, pretreating includes kneading the plurality of solid biomass particles and the catalyst.

In certain embodiments, the deoxygenated product includes less than about 10 wt % oxygen. In one embodiment, deoxygenating includes removing at least about 90 wt % oxygen from the biomass.

In various embodiments, the plurality of solid biomass particles has an average particle size comprising an average of individual particle sizes, wherein the plurality of solid biomass particles has a water content, and wherein the agitating step reduces the average size, the individual particle sizes, and the water content. In one embodiment, the average particle size of the solid biomass particles is reduced to between about 5 μm and about 1,000 μm. In one embodiment, the individual particle sizes of the solid biomass particles are reduced to between about 20 μm and about 500 μm. In one embodiment, more than about 70% of the individual particle sizes are less than about 10 μm.

In some embodiments, the pretreating step is performed at a temperature between about 100° C. and about 150° C.

In certain embodiments, the deoxygenating and cracking step is performed at a temperature between about 200° C. and about 350° C.

In various embodiments, the pretreating step includes flowing a gas to provide an average velocity of between about 10 ft/s (3 m/s) and about 40 ft/s (12 m/s) to the plurality of solid biomass particles. In one embodiment, the pretreating step includes flowing a gas to provide an average velocity of between about 40 ft/s (12 m/s) and about 80 ft/s (24 m/s) to the plurality of solid biomass particles. In one embodiment, the pretreating step includes flowing a gas to provide an average velocity of between about 780 ft/s (240 m/s) and about 1180 ft/s (360 m/s) to the plurality of solid biomass particles.

In some embodiments, the biomass-catalyst mixture further includes an inorganic particulate material.

In certain embodiments, the deoxygenating and cracking step includes a water-gas shift reaction. In one embodiment, deoxygenating preferentially converts oxygen from the biomass into at least one of CO and $CO_2$ relative to $H_2O$. In one embodiment the method also includes using CO derived from deoxygenating the biomass in a gas to liquids process. In one embodiment the method also includes using $CO_2$ derived from deoxygenating the biomass in growing new biomass. In one embodiment the method also includes modulating the cracking and deoxygenating temperature to maximize decarboxylation to maximize $CO_2$ formation, and to minimize hydrogen transfer reaction to minimize $H_2O$ formation.

In various embodiments, methods also include isolating the fuel or specialty chemical product from a product of the cracking and deoxygenating step.

In some embodiments, methods include recycling a portion of the product of the cracking and deoxygenating step for a further cracking and deoxygenating step. In one embodiment, the method includes recycling a portion of the product of the converting step for at least one of a further cracking and deoxygenating step, and a further converting step.

In certain embodiments, methods include recycling cooled catalyst for use in agitating the plurality of solid biomass particles and the catalyst. In one embodiment, the method includes recycling hot catalyst for use in converting the deoxygenated product and remaining biomass-catalyst mixture. In one embodiment, the method includes recycling a mixture of cooled catalyst and hot catalyst for use in cracking and deoxygenating the biomass-catalyst mixture.

In various embodiments, converting the deoxygenated product includes converting a heavy fraction of the deoxygenated product.

Other aspects and advantages of the technology will become apparent from the following drawings and description, all of which illustrate principles of the technology, by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION OF THE TECHNOLOGY

Figure 1:
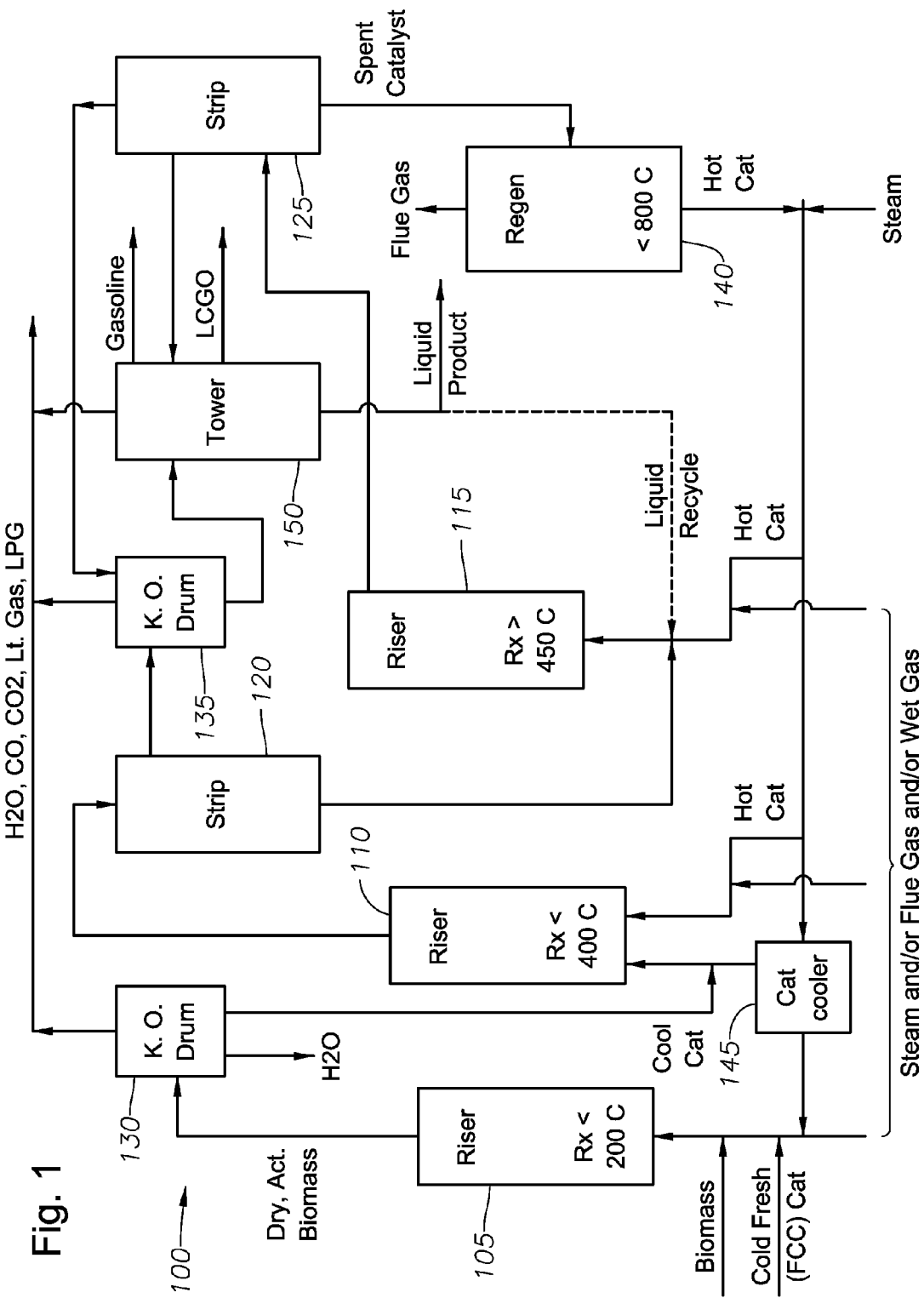
FIG. 1 shows an exemplary catalytic cracking system adapted for a biomass conversion process and a method for operating the system including agitating, deoxygenating/cracking, and converting the biomass into a fuel or specialty chemical product.

The technology provides methods, apparatuses, kits, and compositions for converting solid biomass into fuels and/or specialty chemicals under conditions that can mitigate equipment cost (e.g., by producing less corrosive intermediates and/or using conventional petrochemical refinery units), energy cost (e.g., by operating at lower temperatures and/or with fewer steps), and/or degradation or undesirable reaction of conversion product (e.g., avoiding undesirable oxygenated products). For example, the technology provides methods that generally include pretreating solid biomass and catalyst, deoxygenating and cracking the biomass, and converting the deoxygenated and cracked biomass into a fuel or specialty chemical product.

In one example, a method can include: (i) pretreating a plurality of solid biomass particles and a catalyst at a temperature below about 200° C., to produce a biomass-catalyst mixture; (ii) deoxygenating and cracking the biomass-catalyst mixture with steam and a temperature below about 400° C., to produce a deoxygenated product; and (iii) converting the deoxygenated product and remaining biomass-catalyst mixture with steam and a temperature above about 450° C., to produce a fuel or specialty chemical product. The methods are flexible and pretreating can include biomass particle size reduction and formation of an interaction between the biomass particles and the catalyst. It is also possible to obtain the fuel or specialty chemical product directly from the step of deoxygenating and cracking the biomass-catalyst mixture.

In other examples, the technology provides apparatuses for practicing the methods. For example, the technology includes a three-riser apparatus where a first riser functions for pretreating biomass and catalyst, a second riser functions for deoxygenating (e.g., substantially deoxygenating) and cracking the biomass, and a third riser functions for converting the deoxygenated and cracked biomass (e.g., heavy deoxygenated fraction and unconverted biomass) into a fuel or specialty chemical product. The technology also provides kits for practicing the methods and operating the apparatuses. For example, a kit can include an apparatus and instructions for operating the apparatus in accordance with the technology. A, kit can also include instructions, and optionally components, for adapting a conventional petrochemical refinery unit for processing biomass feedstock in accordance with the technology. The technology also provides compositions of matter (e.g., pretreated feedstocks and intermediates).

Preparation of the biomass for co-processing in conventional petroleum refinery units can have a synergistic effect, reducing the temperature necessary for catalytic conversion of the biomass and/or increasing the conversion efficiency of the biomass and/or facilitating processing of biomass. For example, pretreatment (e.g., biomass particle size reduction, catalyst addition, and or formation of a mechanic-chemical interaction between the biomass and catalyst, described below) can facilitate catalytic conversion under less severe conditions (e.g., lower temperatures and/or shorter time) and with a more efficiency (e.g., higher conversion of the biomass and better quality products from the conversion) than can be achieved in conventional petroleum refinery units. In various embodiments, lower temperature can be between about 400 and about 150° C. for deoxygenating and cracking. For example, the temperature can be below about 400, 375, 350, 325, 300, 275, 250, 225, 200, 175, or 150° C. In various embodiments, the lower temperature can be above about 450° C. for converting. In some embodiments, the synergistic effect can include increasing the yield of organic compounds usable as a fuel, feedstock, and/or specialty chemical, and/or reducing the yield of undesirable products such as tars, coke, and/or unconverted biomass in conventional refinery units. In certain embodiments, the synergistic effect can include converting different biomass components (e.g., cellulose, hemicellulose and/or lignin) under milder conditions (e.g., lower temperature than conventional catalytic cracking) in conventional petroleum refinery units. The synergistic effect can also include making the products of catalytic conversion more uniform, or increasing the selectivity or proportion of the production of desired products (e.g., increasing the proportion of a fraction usable as a fuel, feedstock, or specialty chemical). These results can be accomplished utilizing equipment already present in conventional petroleum refinery units.

Solid Biomass Particles

In various embodiments, biomass includes materials of photosynthetic (e.g., plant) origin having cellulose, hemicellulose, and/or lignin. Biomass includes materials produced by photosynthetic conversion of carbon dioxide and water using solar energy. In general, biomass including cellulose, hemicellulose, and/or lignin originates from land plants. Some aquatic plants include little or no lignin. However, the invention is applicable to any biomass including any amount of cellulose, hemicellulose, and/or lignin. Biomass sources include, but are not limited to, cereal grains (e.g., including corn), grasses, sugar cane, trees, and the like. Biomass sources also include by-products of agricultural or forestry activities, such as straw, chopped straw, cotton linters, corn husks, corn stalks, corn cobs, wood chips, saw dust, bagasse, sugar beet pulp, tree bark, grasses, and the like. Biomass sources also include aquatic sources such as algae and seaweed.

Biomass sources can be used without requiring chemical pre-processing (e.g., chemically altering the biomass). In various embodiments, biomass sources include (chemically) unrefined material of photosynthetic origin. Biomass sources can be subjected to a drying and/or a particle size reduction step. Such a drying and/or a particle size reduction step does not significantly change the relative composition of the biomass in terms of cellulose, hemicellulose and/or lignin and therefore such a step is not necessarily considered refining.

In various embodiments, biomass feedstock can include particles that are solid and in a finely divided form (e.g., saw dust and ground straw). Biomass feedstock can include solid materials as well as materials that might be classified as liquids, but that have a very high viscosity (e.g., small or large colony algae). Biomass particles can be prepared from biomass sources and larger particles by techniques such as milling, grinding, pulverization, and the like. For example, biomass from sources such as straw and wood can be converted to particles in a size range of about 5 mm to about 5 cm using techniques such as milling or grinding.

Agitation of Biomass Particles

In various embodiments, the method includes agitating solid biomass particles, to reduce a size characterizing at least a portion of the particles. In some embodiments, agitating is facilitated by fluid conveyance, including, without limitation, by gas flow or pneumatic conveyance. Agitating can be conducted in a vertical vessel, such as a riser or downer. An agitator can include a conveyor, a riser, or downer. A riser (up flow) or a downer (down flow) can be, for example, a hollow vertical vessel terminating in a larger diameter vessel, which houses high velocity (e.g., about 60-80 m/s or 18-24 m/s) cyclones that may or may not be physically connected to the riser termination point. The height of a riser or downer can be, for example, between about 15 ft (5 m) and about 60 ft (18 m) and the diameter can be, for example, between about 1 ft (0.3 m) and about 4 ft (1.2 m). Agitating can be facilitated by a gas (e.g., gas can convey the particles such that they are abraded or ground by other particles, catalyst, and/or inorganic particulate material). The gas can be one or more of air, steam, flue gas, carbon dioxide, carbon monoxide, hydrogen, and hydrocarbons, (e.g. methane). The gas can be a gas having a reduced level of oxygen (compared to air) or can be substantially oxygen-free. In another embodiment, an agitator can be a mill (e.g., ball or hammer mill) or kneader or mixer (e.g., for mechanical, as opposed to pneumatic, agitation).

In certain embodiments, agitating includes causing the solid biomass particles to be conveyed at a velocity of greater than about 1 m/s. For example, the velocity can be measured relative to a vessel in which the particles are conveyed. Agitating can include causing the solid biomass particles to move at a velocity of greater than about 10 m/s. Agitating can include causing at least a portion of the solid biomass particles to move at a velocity of greater than about 100 m/s. An agitator can be adapted to cause the solid biomass particles to move at a velocity of greater than about 1 m/s, greater than about 10 m/s, and/or greater than about 100 m/s. Other velocities include velocities of greater than about 5, 25, 50, 75, 125, 150, 175, 200, 225, and 250 m/s.

For example, the velocity is selected from the group consisting of: between about 10 and about 20 m/s; between about 20 and about 30 m/s; between about 30 and about 40 m/s; between about 40 and about 50 m/s; between about 50 and about 60 m/s; between about 60 and about 70 m/s; between about 70 and about 80 m/s; between about 80 and about 90 m/s; and between about 90 and about 100 m/s. The velocity can be about 10 m/s, about 20 m/s, about 30 m/s, about 40 m/s, about 50 m/s, about 60 m/s, about 70 m/s, about 80 m/s, about 90 m/s or about 100 m/s. The velocity can be greater than about 10 m/s, about 20 m/s, about 30 m/s, about 40 m/s, about 50 m/s, about 60 m/s, about 70 m/s, about 80 m/s, about 90 m/s, or about 100 m/s.

In various embodiments, agitating solid biomass particles, to reduce a size characterizing at least a portion of the particles, is facilitated by agitating solid biomass particles together with a material that is harder than the biomass. For example, the material can be a catalyst or another inorganic particulate material. The amount of size reduction, and thus the size of the resulting solid biomass particles can be modulated by the duration of agitation and the velocity of agitation. Other factors such as the relative hardness of the catalyst or another inorganic particulate material, the dryness (e.g., brittleness) of the solid biomass particles, and the method/vessel(s) in which agitation occurs also modulate the amount of size reduction.

In embodiments using an abrading or grinding material that is a catalyst, the catalyst can become embedded in the biomass particles, which can facilitate catalytic conversion of the biomass. In such embodiments, agitating can facilitate formation of a mechano-chemical interaction between at least a portion of the catalyst and at least a portion of the solid biomass particles, which can facilitate catalytic conversion of the biomass.

Agitation can be carried out at an elevated temperature, for drying the biomass. An elevated temperature can be a temperature sufficient to dry the biomass, for example, between about 50 and about 150° C., or below about 200° C. Higher temperatures can be used, for example, where an agitating gas is oxygen-poor or substantially oxygen-free. Agitation can also be carried out at ambient temperature with dried biomass. Drying increases the hardness of the biomass particles, making the particles more susceptible to size reduction.

Agitation can be carried out by various different methods and in various different vessels. For example, in order of increasing abrasion, the agitation can be carried out in a fluid bed, a bubbling or ebullient bed, a spouting bed, or a conveyor. In one embodiment, agitation is carried out by fluid conveyance, including without limitation by gas flow or pneumatic conveyance. In one embodiment, agitation is carried out in a riser or a downer.

Agitating solid biomass particles, to reduce a size characterizing at least a portion of the particles, can result in a dispersion of particle sizes. For example, proper agitation the solid biomass particles as described above can result in individual particles sizes ranging from microns, to tens of microns, to tenths of centimeters, to centimeters or greater. In various embodiments, at least a fraction of the biomass particles are reduced to a size below about 100, 90, 80, 70, 60, 50, 45, 40, 35, 30, 25, 20, or 15 microns.

In general, at least a fraction of the biomass particles are reduced to a size between about 1 mm and 1 micron. For example, the biomass particles can have an average size of about 300-500 microns comprised of mainly individual sizes of about 10-1,000 microns.

In various embodiments, the plurality of solid biomass particles are substantially characterized by an average size between about 50 and about 70 microns and individual sizes between about 5 and about 250 microns. In other embodiments, the plurality of solid biomass particles are substantially characterized by an average size between about 10 and about 20 microns and individual sizes between about 5 and about 50 microns. In other embodiments, the plurality of solid biomass particles are substantially characterized by an average size between about 100 and about 150 microns and individual sizes between about 5 and about 500 microns.

International Publication No. WO 2007/128798 A1 by O'Connor, the disclosure of which is incorporated herein by reference in its entirety, discloses agitating solid biomass particles and catalysts. In particular, paragraphs [0027] to [0072] of WO 2007/128798 A1 are incorporated herein by reference.

International Publication No. WO 2008/009643 A2 by O'Connor, the disclosure of which is incorporated herein by reference in its entirety, discloses agitating solid biomass particles and catalysts. In particular, paragraphs [0009] to [0051] of WO 2008/009643 A2 A1 are incorporated herein by reference.

Separation of Biomass Particles

In various embodiments, methods include separating a biomass-catalyst mixture into a fine fraction and a coarse fraction. The biomass-catalyst mixture includes the biomass particles and a catalyst. The fine fraction includes particles of about a predetermined size. The coarse fraction includes particles of greater than about the predetermined size. Separating the mixture into a fine fraction and a coarse fraction can have several effects. For example, a fine fraction can be selected to include particles of about a predetermined size, below about a predetermined size, and/or within a predetermined size range. In some embodiments, the fine fraction can be selected to consist essentially of particles of about a predetermined size, below about a predetermined size, and/or within a predetermined size range. Furthermore, a coarse fraction can be recycled for further size reduction and/or to produce more of a fine fraction.

A predetermined size can be selected based upon one or more requirements of a subsequent reaction. For example, a predetermined size can be selected to facilitate substantial catalytic conversion of the fine fraction in a subsequent reaction. A predetermined size can be selected to facilitate contact, impregnation, and/or interaction of the catalyst and the biomass. In some embodiments, a predetermined size can be about 1,000, 900, 800, 700, 600, 500, 450, 400, 350, 300, 250, 200, 150, 100, 50, 45, 40, 35, 30, 25, 20, 15, 10, or 5 microns. In one embodiment, a predetermined size is about 15 microns. In one embodiment, a predetermined size is about 10 microns. A predetermined size can be between about 5 and about 1000 microns.

Separating can be facilitated by a cyclonic action. A separator can include a single cyclone. Alternatively, a separator can include a plurality of cyclones arranged, for example, in parallel, series, as a third stage separator, or as a fourth stage separator. U.S. Pat. No. 6,971,594 to Polifka, the disclosure of which is incorporated herein by reference in its entirety, discloses cyclonic action and cyclone separators that can be adapted and employed with the invention. In particular, FIG. 2, the text corresponding to FIG. 2, and the text corresponding to column 4, line 55 to column 11, line 55 of U.S. Pat. No. 6,971,594 are incorporated herein by reference.

Separating can be achieved by other known methods. For example, separating can be achieved by screening, settling, clarification, and the like.

Catalysts and Inorganic Particulate Materials

A catalyst can be any material that facilitates the conversion of organic components of the biomass into fuels, specialty chemicals, or precursors thereof. In various embodiments, the catalyst includes a solid particulate catalyst and the biomass-catalyst mixture includes at least a portion of the catalyst mechano-chemically interacting with at least a portion of the solid biomass particles. In some embodiments, the catalyst includes a catalyst capable of being at least partly dissolved or suspended in a liquid and the biomass-catalyst mixture includes at least a portion of the catalyst impregnating at least a portion of the solid biomass particles.

In various embodiments, a catalyst is a particulate inorganic oxide. The particulate inorganic oxide can be a refractory oxide, clay, hydrotalcite, crystalline aluminosilicate, layered hydroxyl salt, or a mixture thereof. Suitable refractory inorganic oxides include alumina, silica, silica-alumina, titania, zirconia, and the like. In one embodiment, the refractory inorganic oxides have a high specific surface (e.g., a specific surface area as determined by the Brunauer Emmett Teller ("BET") method of at least 50 m²/g). Suitable clay materials include cationic and anionic clays, for example, smectite, bentonite, sepiolite, atapulgite, hydrotalcite, and the like. Suitable metal hydroxides and metal oxides include bauxite, gibbsite and their transition forms. Other suitable (and inexpensive) catalysts include lime, brine, and/or bauxite dissolved in a base (e.g., NaOH), or a natural clay dissolved in an acid or a base, or fine powder cement (e.g., from a kiln). Suitable hydrotalcites include hydrotalcite, mixed metal oxides and hydroxides having a hydrotalcite-like structure, and metal hydroxyl salts.

In some embodiments, a catalyst can be a catalytic metal. The catalytic metal can be used alone or together with another catalyst. A catalytic metal can be used in a metallic, oxide, hydroxide, hydroxyl oxide, or salt form, or as a metallo-organic compound, or as a material including a rare earth metal (e.g., bastnesite). In certain embodiments, the catalytic metal is a transition metal. The catalytic metal can be a non-noble transition metal. For example, the catalytic metal can be iron, zinc, copper, nickel, and manganese. In one embodiment, the catalytic metal is iron.

A catalytic metal can be contacted with the biomass by various methods. In one embodiment, the catalyst is added in its metallic form, in the form of small particles. Alternatively, the catalyst can be added in the form of an oxide, hydroxide, or a salt. In another embodiment, a water-soluble salt of the metal is mixed with the biomass and the inert particulate inorganic material to form an aqueous slurry. The biomass and the aqueous solution of the metal salt can be mixed before adding the inert particulate inorganic material to facilitate the metal's impregnating the biomass. The biomass can also be mixed with the inert particulate inorganic material prior to adding the aqueous solution of the metal salt. In still another embodiment, an aqueous solution of a metal salt is mixed with the inert inorganic material, the material is dried prior to mixing it with the particulate biomass, and the inert inorganic material is thus converted to a heterogeneous catalyst.

The biomass-catalyst mixture can include an inorganic particulate material. An inorganic particulate material can be inert or catalytic. An inorganic material can be present in a crystalline or quasi-crystalline form. Exemplary inert materials include inorganic salts such as the salts of alkali and alkaline earth metals. Although these materials do not necessarily contribute to a subsequent chemical conversion of the polymeric material, it is believed that the formation of discrete particles of these materials within the biomass can work as a wedge to mechanically break up or open the structure of the biomass, which can increase the biomass surface accessible to microorganisms and/or catalysts. In one embodiment, the breaking up or opening is facilitated by crystalline or quasi-crystalline particles.

Inorganic particulate material can have catalytic properties. For example, a catalytic inorganic particulate material can be a metal oxide or hydroxide such as an alumina, silica, silica aluminas, clay, zeolite, ionic clay, cationic layered material, layered double hydroxide, smectite, saponite, sepiolite, metal hydroxyl salt, and the like. Carbonates and hydroxides of alkali metals, and the oxides, hydroxides and carbonates of alkaline earth metals can also have catalytic properties. Inorganic particulate material can include mixtures of inorganic materials. Inorganic particulate material can include a spent (resid) fluid catalytic cracking catalyst containing (thermally treated) layered material. Employing spent catalyst can involve reusing waste material. The spent catalyst can be ground of pulverized into smaller particles to increase its dispersibility. Inorganic particulate material can also include sandblasting grit. Employing sandblasting grit can involve reusing waste material, which can include particles of iron, and lesser quantities of other suitable metals such as nickel, zinc, chromium, manganese, and the like (e.g., grit from steel sandblasting).

Contacting the catalyst, and optionally the inorganic particulate material, with the biomass, can be achieved by various methods. One method includes heating and fluidizing a mixture of the particulate biomass material and the inert inorganic material, and adding the catalyst to the mixture as fine solid particles. Another method includes dispersing the catalytic material in a solvent (e.g., water), and adding the solvent to the mixture of particulate biomass material and the inert inorganic material.

European Patent Application No. EP 1 852466 A1 by O'Connor, the disclosure of which is incorporated herein by reference in its entirety, discloses catalysts and contacting catalysts and biomass. In particular, paragraphs [0011] to [0043] of EP 1 852466 A1 are incorporated herein by reference.

International Publication No. WO 2007/128799 A1 by O'Connor, the disclosure of which is incorporated herein by reference in its entirety, discloses catalysts and contacting catalysts and biomass. In particular, paragraphs [0015] to [0054] of WO 2007/128799 A1 are incorporated herein by reference.

Removing Metals and/or Minerals

In various embodiments, a pretreatment can reduce an ash content of biomass, or a hazardous disposal characteristic of an ash that may be subsequently produced. Removal of minerals (e.g., ash precursors) from the biomass can reduce the ash content. Removal of metals (e.g., ash precursors), particularly heavy metals, can also reduce ash content and prevent metal contamination of waste products, thereby facilitating disposal of waste by providing an uncontaminated waste product and reducing the cost of disposing of the waste product.

A pretreatment for reducing ash content can include swelling the biomass with a solvent and then removing solvent from the swollen biomass material by applying mechanical action to the biomass material. Ash precursors, such as dissolved minerals and/or metals, will thus be removed with the solvent. The solvent can be aqueous. The solvent can include an acid or base (e.g., inorganic acid or base). The mechanical action can occur in an agitator and/or a kneader. The mechanical action can be exerted by equipment such as a high shear mixer, kneader, colloid mill, planetary mixer, mix-miller, or ball mill. A pretreatment for reducing ash content can include washing or slurrying with an aqueous phase having pH above or below neutral, ion exchange (e.g., with ammonium solutions that would exchange a hydrogen ion with a metal ion), and steam stripping are possible methods.

Pretreatment can reduce ash content to less than about 10 wt %, 9 wt %, 8 wt %, 7 wt %, 6 wt %, 5 wt %, 4 wt %, 3 wt %, 2 wt %, or 1 wt %, based on dry weight of the biomass material. The pretreatment can reduce metal (e.g., Fe) content to less than about 3,000, 2,500, 2,000, 1,500, 1,000, or 500 mg/kg, based on dry weight of the biomass.

Kneaders

A kneader can be used to knead the solid biomass particles and the catalyst, to make at least a portion of the solid biomass particles accessible to at least a portion of the catalyst. The kneader can be an extruder, miller, mixer, or grinder. The kneader can operate at greater than ambient temperature, for example, to facilitate removal or water and/or other solvent.

For example, the kneader can be heated and/or heated gas (e.g., steam) can be provided to heat the biomass and catalyst.

In various embodiments, the kneader employs a solvent. The solvent can be water, an alcohol (e.g., ethanol or glycerol), a bio-oil or another product from the conversion of the biomass, a liquid acid, an aqueous solution of an acid or base, liquid $CO_2$, and the like. In one embodiment, the solvent is water (e.g., added water and/or water inherently present in the biomass), which can be selected for its availability, low cost, and/or ease of handling. In another embodiment, the solvent is a liquid produced during the subsequent conversion of the biomass, which can be selected for its availability. A solvent can be selected to improve penetration of a catalyst into biomass. A solvent can also improve penetration of a catalyst into biomass because a dry biomass can be more difficult to penetrate. A solvent can also be selected to remove ash precursors. Solvents can be removed (e.g., by drying) prior to subsequent processing and/or conversion. A kneader can remove at least a portion of a solvent absorbed in a biomass (e.g., by mechanical action and draining). Embodiments employing a kneader and a solvent can reduce the ash and/or mineral and/or metal content of the biomass.

In various embodiments, the biomass can be kneaded with one or more solid catalyst and/or inorganic particulate material. In some embodiments, the biomass can be kneaded with a dissolved and/or suspended catalyst. The dissolved and/or suspended catalyst can be used together with one or more solid catalyst and/or inorganic particulate material. Kneading can be continued and/or repeated to produce a biomass-catalyst mixture having the desired properties (e.g., particle size and/or degree of sensitization).

International Publication No. WO 2007/128800 A1 by O'Connor, the disclosure of which is incorporated herein by reference in its entirety, discloses catalysts and sensitizing biomass, as well as sensitizing by kneading. In particular, paragraphs [0025] to [0074] with respect to catalysts and sensitizing biomass, as well paragraphs [0076] to [0086] with respect to sensitizing by kneading, of WO 2007/128800 A1 are incorporated herein by reference.

Disintegrators

The disintegrator processes plant matter at a location in close proximity to an agricultural site used to produce such plant matter, to produce the solid biomass particles. In operation, a disintegrator can be used to modify the consistency of, e.g., biomass feedstock, and/or to reduce its average particle size. The disintegrator can include at least one of a mill, fragmenter, fractionator, granulator, pulverizer, chipper, chopper, grinder, shredder, mincer, and a crusher. Apparatuses including a disintegrator can process plain matter at a location in close proximity to an agricultural site used to produce such plant matter, to produce the solid biomass particles. U.S. Pat. No. 6,485,774 to Bransby, the disclosure of which is incorporated herein by reference in its entirety, discloses a method of preparing and handling chopped plant materials. In particular, the text corresponding to column 1, line 45 to column 4, line 65 of U.S. Pat. No. 6,485,774 is incorporated herein by reference.

EXAMPLES

Figure 2:
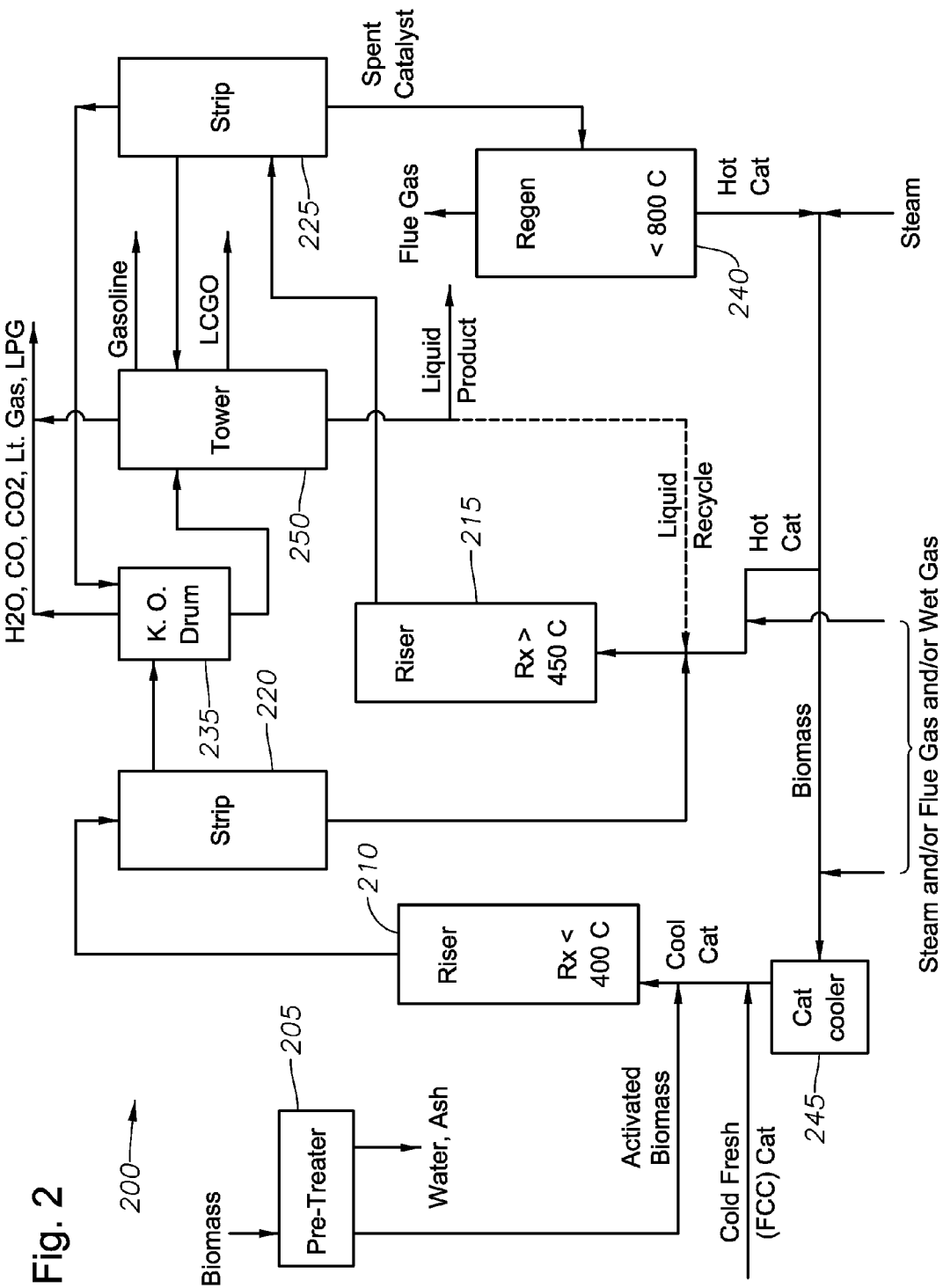
FIG. 2 shows an exemplary catalytic cracking system adapted for a biomass conversion process and a method for operating the system including pretreating, deoxygenating/cracking, and converting the biomass into a fuel or specialty chemical product.

FIGS. 1 and 2 show exemplary systems for preparing and processing biomass with catalyst. The technology also includes methods corresponding to the operation of the systems (i.e., apparatuses) corresponding to FIGS. 1 and 2. The technology also includes kits for setting up the apparatuses and carrying out the methods corresponding to FIGS. 1 and 2. The technology also includes products and intermediates, and fractions thereof, corresponding to FIGS. 1 and 2. It should be understood that one skilled in the art could modify or adapt the exemplary systems, or any other system described herein, to convert biomass into fuels or specialty chemicals. For example, catalyst, reaction vessel(s), pretreatment, and reaction conditions can be selected based upon the type of biomass and the desired product. In some embodiments, the processing can occur in a single vessel. In other embodiments, two or more vessels can be used.

In various embodiments, the intermediates include hydrocarbons from which oxygen is stripped (e.g., as CO, $CO_2$, $H_2O$) to produce traditional fuel or specialty chemical products such as light gases, naphtha, heating oils, and the like. In general, processing proceeds by cracking and deoxygenating (as necessary) polymeric compounds in the biomass into a fuel or specialty chemical product. In various embodiments, intermediates can be stripped quickly from the catalysts and unconverted biomass to limit secondary (e.g., undesired) reactions.

FIG. 1 shows an exemplary catalytic cracking system 100 adapted for a biomass conversion process and a method for operating the system 100. The system 100 includes a first riser 105, second riser 110, third riser 115, first stripper 120, second stripper 125, first knock out drum 130, second knock out drum 135, regenerator 140, catalyst cooler 145, and tower 150.

In various embodiments, the system 100 is operated according to a method where:

First, a plurality of solid biomass particles and a catalyst are agitated at a temperature below about 200° C. in the first riser 105, to produce a biomass-catalyst mixture having a mechano-chemical interaction between the solid biomass particles and the catalyst.

Second, the biomass-catalyst mixture is deoxygenated and cracked, together with steam and at temperature below about 400° C., in the second riser 110, to produce a deoxygenated product.

Third, the deoxygenated product and remaining biomass-catalyst mixture, together with steam and at a temperature above about 450° C., is converted in the third riser 115, to produce a fuel or specialty chemical product.

In various embodiments, deoxygenating includes reducing an oxygen content of the biomass-catalyst mixture. Oxygen reduction does not need to be complete, although it can be essentially complete (e.g., approximately 100% removal) in some embodiments. In one embodiment, the deoxygenated product includes less than about 10 wt % oxygen. In various embodiments, the deoxygenated product can include about 0-5, 5-10, 10-15, 15-20, or 20-25 wt % oxygen. In one embodiment, deoxygenating the biomass-catalyst mixture includes removing at least about 90 wt % oxygen from the biomass. In various embodiments, deoxygenating the biomass-catalyst mixture includes removing about 75-80, 80-85, 85-90, 90-95, or 95-100 wt % oxygen from the biomass.

The deoxygenated product can include products, intermediates, or both. The deoxygenated product can include a vapor phase at temperature below about 400° C. (i.e., the deoxygenating and cracking temperature). The deoxygenated product can include a liquid phase at temperature below about 20° C. (i.e., "room temperature").

In various embodiments, converting the deoxygenated product comprises converting a heavy fraction of the deoxygenated product. For example, a light fraction from the deoxygenating and cracking step can be used (e.g., either directly or after separation) while a heavy fraction (e.g., oil)

can be directed for further conversion to produce a fuel or specialty chemical product. The remaining biomass can include unconverted biomass.

The first riser 105 can receive a plurality of solid biomass particles and a catalyst, and agitate the solid biomass particles. The catalyst can be a fresh (e.g., fluidizable, microspherical, or, in some embodiments, FCC or FCC-like) catalyst and/or cool recycled catalyst. Agitating the solid biomass particles can reduce the sizes of the solid biomass particles (e.g., the first riser 105 can receive a gas, such as steam, flue gas, wet gas, or a combination thereof, that conveys the solid biomass particles). In various embodiments, the solid particles are reduced to a size sufficient to be dissolved or suspended in a liquid feedstock (e.g., biomass, conventional, or mixtures thereof). In some embodiments, the solid biomass particles are reduced to a size sufficient that the solid biomass particles flow like a liquid and can be gravity-fed (or transport-fed) into a subsequent reaction vessel. Agitating can produce a biomass-catalyst mixture having a mechano-chemical interaction between the solid biomass particles and the catalyst. In some embodiments, the biomass-catalyst mixture further includes an inorganic particulate material.

The gas can agitate the solid biomass particles and the catalyst, providing a velocity to at least a portion of the solid biomass particles sufficient to reduce their sizes (e.g., through abrasion or grinding action). For example, flowing a gas can provide an average velocity of between about 10 ft/s (3 m/s) and about 40 ft/s (12 m/s) to the plurality of solid biomass particles. Flowing a gas can provide an average velocity of between about 40 ft/s (12 m/s) and about 80 ft/s (24 m/s) to the plurality of solid biomass particles. The resulting solid biomass particles can be substantially characterized by an average size between about 50 and about 70 microns or between about 100 and about 500 microns. The resulting solid biomass particles can be substantially characterized by individual sizes between about 5 and about 250 microns.

In various embodiments, de-watering of the biomass can also occur in the first riser 105 (e.g., by evaporation, mechanical action, or both). Drying can be facilitated by heating the solid biomass particles. However, the first riser 105 can be operated at a temperature (e.g., below about 150, 160, 170, 180, 190, or 200° C.) lower than the temperature of the second riser 110 and the third riser 115, to mitigate undesired conversion of the biomass in the first riser 105. Drying can also be facilitated by the mechanical action of agitation (e.g., pressed or squeezed out). The water and/or other solvent can be vented and/or drained.

In operation, the biomass-catalyst mixture from the first riser 105 is ultimately received by the second riser 110. However, the method can include various steps or processes between the first 105 and second 110 risers. For example, the first knock out drum 130 can receive the biomass-catalyst mixture from the first riser 105, before it is received by the second riser 110.

The first knock out drum 130 can cool and liquefy at least a portion of a gas fraction (cooling provided, but not shown) from the first riser 105, which allows aqueous and hydrophobic phases to separate. The aqueous phase (e.g., water) can be removed and the hydrophobic phase can be separated as a liquid product (e.g., fuels, specialty chemicals, other intermediates) using a separator (not shown). Another portion of the gas fraction (e.g., from the knock out drum overheads) can include desirable products that are not liquefied (e.g., light gas, liquefied petroleum gas), but which can be separated and used, as well as oxygenated gases (e.g., $H_2O$, CO, $CO_2$). In some embodiments the oxygenated gases can also be used (e.g., using CO, to facilitate algae growth, which has the additional benefit of reducing greenhouse gas/carbon emissions). However, in various embodiments where the function of the first riser 105 is physical preprocessing and where chemical conversion is minimized (e.g., by a relatively low temperature), the liquefaction of the fuel or specialty chemical product and/or the knock out drum 130 itself may not be necessary.

In various embodiments, the first knock out drum 130 can dry the biomass particles.

The second riser 110 can receive the biomass-catalyst mixture, solid biomass particles, catalyst (e.g., cool fresh catalyst, as described herein, cool fresh FCC catalyst, and/or cool recycled catalyst, or hot catalyst), or a combination thereof. In the system 100, the biomass-catalyst mixture, solid biomass particles, and catalyst can be received from the first knock out drum 130, the catalyst cooler 145, the regenerator 140, or a combination thereof. In various embodiments, cool catalyst is about 105° C. The second riser 110 can also receive a gas (e.g., steam, flue gas, and/or wet gas), which can heat the second riser 110. For example, the second riser 110 can be operated at a temperature below about 400° C. The second riser 110 can be heated, for example, by hot catalyst or gas.

De-oxygenation and cracking of the biomass can occur in the second riser 110. In various embodiments, the second riser 110 can be operated at a temperature (e.g., below about 400° C., or about 200 to about 350° C.) lower than a conventional (e.g., petrochemical) reactor. The lower temperature can facilitate conversion and product selectivity from solid biomass to liquefied biomass feedstock.

In various embodiments, de-oxygenation and cracking of the biomass includes operating the second riser 110 (or, more generally reaction vessel) at a temperature selected from the group consisting of about 400° C., about 375° C., about 350° C., about 325° C., about 300° C., about 275° C., about 250° C., about 225° C., about 200° C., between about 400 and 375° C., between about 375 and 350° C., between about 350 and 325° C., between about 325 and 300° C., between about 300 and 275° C., between about 275 and 250° C., between about 250 and 225° C., between about 225 and 200° C., between about 200 and 175° C., and between about 175 and 150° C.

In various embodiments, it is possible to control the chemical reactions within the second riser 110. For example, it is possible to control deoxygenating and cracking within the second riser 110, so that the chemical reactions proceed through a water-gas shift reaction. The reactions in the second riser 110 can be controlled to preferentially convert oxygen from the biomass into at least one of CO and $CO_2$ relative to $H_2O$. It is possible to use the CO derived from deoxygenating the biomass in a gas to liquids process. It is possible to use $CO_2$ derived from deoxygenating the biomass in growing new biomass (e.g., feed to algae in a lank). In one embodiment the reactions in the second riser 110 can be modulated, for example through the cracking and deoxygenating temperature, to maximize decarboxylation to maximize $CO_2$ formation, and to minimize hydrogen transfer reaction to minimize $H_2O$ formation.

In various embodiments, it is possible to isolate a fuel or specialty chemical product from a product of cracking and deoxygenating (e.g., through the stripper 120 and the second knock out drum 135, or through the stripper 120, the second knock out drum 135, and the tower 150).

In various embodiments, it is possible to recycle a product of cracking and deoxygenating for further cracking and deoxygenating (e.g., through a stripper or a knock out drum).

In operation, the deoxygenated product from the second riser 110 is ultimately received by the third riser 115. However, the method can include various steps or processes between the second 110 and third 115 risers. For example, the first stripper 120, the second knock out drum 135, the tower 150 can receive the deoxygenated product from the second riser 110 and process the deoxygenated product, before it is received by the third riser 115.

The first stripper 120 can receive biomass and catalyst (e.g., the remaining biomass-catalyst mixture) from the first riser 105, can fluidize the catalyst, and can strip hydrocarbons from the surface of the catalyst. Stripping can be facilitated by steam (e.g., steam can remove hydrocarbons in the interstitial spaces on or between catalyst particles).

The second knock out drum 135 can receive a gas fraction from the overhead of the first stripper 120 and/or the second stripper 125. The second knock out drum 135 can independently include any of the features or functions described in connection with the first knock out drum 130.

The third riser 115 can receive a fluidized fraction (e.g., the deoxygenated product, a heavy fraction thereof, unconverted biomass) from the first stripper 115, the tower 150, or both. The third riser 115 can receive (e.g., recycle), and be heated by, hot catalyst from the regenerator 140. The third riser 115 can also receive, and be heated by, a hot gas (e.g., steam, flue gas, wet gas). In some embodiments the third riser 115 operates at a temperature above about 450° C. In various embodiments, the third riser 115 can be operated essentially as a conventional reactor (i.e., a reactor designed for processing conventional petroleum feedstock, not liquefied biomass feedstock). The third riser 115 can also be adapted to recycle intermediates for further conversion into the fuel or specialty chemical product.

In some embodiments, the third riser 115 can also receive a conventional (e.g., petrochemical) feedstock. Thus, the third riser 115 can co-process the liquefied biomass feedstock (e.g., the deoxygenated product, a heavy fraction thereof) and the conventional petroleum feedstock. In various embodiments, the liquefied biomass feedstock is between about 1 and about 100 wt % of the biomass-conventional petroleum feedstock used in co-processing. The liquefied biomass feedstock can be between about 5 and about 50 wt % of the biomass-conventional petroleum feedstock used in co-processing. The liquefied biomass feedstock can be between about 10 and about 20 wt % of the biomass-conventional petroleum feedstock used in co-processing.

The second stripper 125 can receive the product of the third riser 115, strip hydrocarbons from the surface of the catalyst, provide a gas and/or liquid fraction to the second knock out drum 135, and provide any spent catalyst to the regenerator 140. As with the first stripper 120, stripping can be facilitated by steam. The operating parameters of the first stripper 120 and the second stripper 125 can be the same or independently selected and controlled. In various embodiments the strippers, 120 and 125 can be operated within the operating parameters of a conventional catalytic cracking system (e.g., about 450 to about 550° C.). Stripping can be accomplished by introducing high temperature steam at the bottom of the stripper, which can increase the stripper temperature to about 300 to about 350° C. Such temperatures can result in deoxygenation. In general, the stripper temperature can be at about, or below about, the temperature of the third riser 115.

The regenerator 140 can receive spent catalyst from the second stripper 125, and can be used to regenerate the catalyst for reuse. In this arrangement, the second stripper 125 increases product yield, decreases coke, decreases flue gas production, and decreases the necessary regenerator temperature because it decreases the amount of hydrocarbons that enter, and are thus burned in, the regenerator 140. The regenerator 140 can be heated by steam (e.g., dispersion steam) to a temperature below about 800° C. The regenerator 140 produces flue gas, which can be used in other portions of the system (e.g., risers 110 and 115).

The catalyst cooler 145 can receive hot regenerated catalyst from the regenerator 140, and cool the catalyst. The cooled catalyst can be reintroduced into the system 100 in the first riser 105, the second riser 110, or both. In general, the catalyst cooler 145 can be operated by known methods (e.g., as in a conventional FCC system). However, the temperature to which the catalyst cooler cools the catalyst can be selected based upon the operating parameters of the reactor to which the cooled catalyst will be delivered. For example, if the cooled catalyst will be delivered to a deoxygenating reactor, the cooled catalyst should be compatible with a reactor operating at less than about 350° C. For example, if the cooled catalyst will be delivered to a dewatering and particle size reducing reactor (e.g., three riser systems), the cooled catalyst should be compatible with a reactor operating at less than about 200° C.

In various embodiments, the system 100 can be modified and operated according to a method where:

First, a plurality of solid biomass particles and a catalyst are agitated at a temperature below about 200° C. in the first riser 105, to produce a biomass-catalyst mixture having a mechano-chemical interaction between the solid biomass particles and the catalyst.

Second, the biomass-catalyst mixture is deoxygenated and cracked, together with steam and at temperature below about 400° C., in the second riser 110, to produce a deoxygenated product.

In these embodiments, the third riser 115 can be deleted and an intermediate or hydrocarbon product can be isolated from at least a portion of the deoxygenated product.

In various embodiments, one or more of the first riser 105, second riser 110, third riser 115, first stripper 120, second stripper 125, first knock out drum 130, second knock out drum 135, regenerator 140, catalyst cooler 145, and tower 150 can be part of a preexisting catalytic cracking system. A separation section of a preexisting catalytic cracking system can also be used, along with existing pieces of equipment such as air blowers, gas compressors, pumps, and the like. The preexisting catalytic cracking system can be retrofit for processing solid biomass particles. Retrofitting can include, for example, adding the catalyst cooler 145, tower 150, first riser 105, and second knock out drum 135. Retrofitting can include modulating the operating parameters of one or more components of the preexisting catalytic cracking system.

FIG. 2 shows an exemplary catalytic cracking system 200 adapted for a biomass conversion process and a method for operating the system 200. The system 200 includes a kneader 205, second riser 210, third riser 215, first stripper 220, second stripper 225, knock out drum 235, regenerator 240, catalyst cooler 245, and tower 250.

In various embodiments, the system 200 is operated according to a method where:

First, a plurality of solid biomass particles and a catalyst are pre-treated at a temperature below about 200° C. in the pretreater 205, to produce a biomass-catalyst mixture.

Second, the biomass-catalyst mixture is deoxygenated and cracked, together with steam and at temperature below about 400° C., in the second riser 210, to produce a deoxygenated product.

Third, the deoxygenated product and remaining biomass-catalyst mixture, together with steam and at a temperature above about 450° C., is converted in the third riser 215, to produce a fuel or specialty chemical product.

In the system 200, the pretreater 205 can be, for example, a kneader, a cyclone, or both. However, a suitable pretreater 205 requires only particle size reduction and, in various embodiments de-watering and formation of a mechanochemical interaction between the solid biomass particles and the catalyst. Accordingly, other pretreaters such as mills and grinders can also be included.

Note that the system 200 shown in FIG. 2 is similar to the system 100 shown in FIG. 1, except that the system 200 includes the pretreater 205 in place of the first riser 105.

The pretreater 205 can receive and physically pre-treat the biomass, thereby increasing the available exposed surface area and commencing the separation of its constituents. In various embodiments, the pretreater 205 includes a kneader for kneading the plurality of solid biomass particles and the catalyst. The pretreater 205 can also receive a solvent (e.g., $H_2O$, ethanol), which can facilitate removal of ash (e.g., minerals, metals) from the biomass, as described above. At least a portion of the solvent, and/or other liquid intrinsic to unprocessed biomass, can also be removed from the biomass in the pretreater 205. In various embodiments, the pretreater 205 can receive a catalyst and knead the solid biomass particles and the catalyst, to make at least a portion of the solid biomass particles accessible to at least a portion of the catalyst (e.g., produce biomass "activated" for catalytic conversion). In various embodiments, the pretreater 205 can effect a size reduction in solid biomass particles. For example, a pretreater 205 can include a kneader used in conjunction with a cyclone, to effect a particle size reduction and a separation based upon particle size. It is also possible knead or re-knead solid biomass particles after cyclonic treatment.

A cyclone can receive the kneaded biomass from the kneader, and agitate the solid biomass particles. Agitating the solid biomass particles can reduce the sizes of the solid biomass particles (e.g., the cyclone can receive a gas that conveys the solid biomass particles). In various embodiments, the solid particles are reduced to a size sufficient to be dissolved or suspended in a liquid feedstock (e.g., biomass, conventional petroleum, or mixtures thereof) and introduced directly into the second riser 210. In some embodiments, the solid biomass particles are reduced to a size sufficient that the solid biomass particles flow like a liquid and can be gravity-fed into a subsequent reaction vessel. The cyclone can dry (e.g., dewater and/or remove other solvent) the solid biomass particles. Drying can be facilitated by heating the solid biomass particles (e.g., agitating with a hot gas). Drying can also be facilitated by mechanical action. The water and/or other solvent can be vented (e.g., in a gas phase) and/or drained (e.g., in a liquid phase).

In various embodiments, the second riser 210, third riser 215, first stripper 220, second stripper 225, knock out drum 235, regenerator 240, catalyst cooler 245, and tower 250 function essentially as the second riser 110, third riser 115, first stripper 120, second stripper 125, knock out drum 135, regenerator 140, catalyst cooler 145, and tower 150, respectfully described in connection with FIG. 1.

In various embodiments, one or more of the pretreater 205, second riser 210, third riser 215, first stripper 220, second stripper 225, knock out drum 235, regenerator 240, catalyst cooler 245, and tower 250 can be part of a preexisting catalytic cracking system. The preexisting catalytic cracking system can be retrofit for processing solid biomass particles. Retrofitting can include adding the pretreater 205, second riser 210, third riser 215, first stripper 220, second stripper 225, knock out drum 235, regenerator 240, catalyst cooler 245, and tower 250. Retrofitting can include modulating the operating parameters of one or more components of the preexisting catalytic cracking system.

While the technology has been particularly shown and described with reference to specific embodiments, it should be understood by those skilled in the art that various changes in form and detail may be made without departing from the spirit and scope of the technology as defined by the appended claims.

That which is claimed is:

1. A process for the conversion of solid biomass to hydrocarbons comprising:
   a. contacting said solid biomass with a catalyst in a first riser operated at a temperature in the range of from about 50° C. to about 200° C. to thereby produce a first biomass-catalyst mixture and a first product comprising hydrocarbons;
   b. separating said first product from said first biomass-catalyst mixture;
   c. charging said first biomass-catalyst mixture to a second riser operated at a temperature in the range of from about 200° C. to about 400° C. to thereby produce a second biomass-catalyst mixture and a second product comprising hydrocarbons;
   d. separating said second product from said second biomass-catalyst mixture;
   e. charging said second biomass-catalyst mixture to a third riser operated at a temperature greater than about 450° C. to thereby produce a spent catalyst and a third product comprising hydrocarbons; and
   f. separating said third effluent from said spent catalyst.

2. The process in accordance with claim 1 wherein said first riser is operated at a temperature in the range of from about 100 to about 150° C., and said second riser is operated at a temperature in the range of from about 200 to about 350° C.

3. The process in accordance with claim 1 wherein said first product, said second product and said third product are blended together to form a final product comprising components selected from the group consisting of ethane, propane, butane and hydrocarbons boiling in the range of naphtha, jet fuel, diesel, heating oil, and combinations thereof.

4. The process in accordance with claim 1 wherein said solid biomass is contacted with said catalyst by agitation in a gas flow resulting in intimate contact between said solid biomass and said catalyst.

5. The process in accordance with claim 1 wherein said catalyst is selected from the group consisting of a catalytic metal, a refractory oxide, clay, hydrotalcite, crystalline aluminosilicate, layered hydroxyl salt, and combinations thereof.

6. The process in accordance with claim 1 wherein a heavy fraction of said second product is separated from said second product and charged along with said second biomass-catalyst mixture to said third riser for conversion to lighter hydrocarbons.

7. The process in accordance with claim 1 wherein a heavy fraction of said third product is separated from said third product and recycled to said third riser for conversion to lighter hydrocarbons.

8. The process in accordance with claim 1 wherein said spent catalyst is charged to a regenerator wherein coke is burned off from said spent catalyst forming regenerated catalyst, and wherein portions of said regenerated catalyst are recycled to said second riser and said third riser with or without intermediate cooling.

9. The process in accordance with claim 8 wherein a portion of said regenerated catalyst is recycled to said first riser with or without intermediate cooling.

10. The process in accordance with claim 1 wherein said second biomass-catalyst mixture comprises liquefied biomass feedstock resulting from the conversion of at least a portion of said solid biomass contained in said first biomass-catalyst mixture.

11. The process in accordance with claim 1 wherein said solid biomass comprises hemi-cellulose, cellulose and lignin.

12. The process in accordance with claim 11 wherein at least a portion of said hemicellulose is converted to hydrocarbons in said first riser.

13. The process in accordance with claim 11 wherein at least a portion of said cellulose is converted to hydrocarbons in said second riser.

14. The process in accordance with claim 11 wherein at least a portion of said lignin is converted to hydrocarbons in said third riser.

15. The process in accordance with claim 1 wherein said step e) is performed in the presence of steam.

16. The process in accordance with claim 1 wherein said solid biomass is at least partially dried during said step a).

17. The process in accordance with claim 1 wherein a petroleum feedstock is changed to said third riser along with said second biomass-catalyst mixture.

* * * * *